UNITED STATES PATENT OFFICE.

REINHARD OEHME, OF BRUSSELS, BELGIUM, ASSIGNOR TO OTTO VOLZ, OF BERLIN, GERMANY.

PROCESS OF CONCENTRATING FRUIT-JUICES.

950,950.  Specification of Letters Patent.  Patented Mar. 1, 1910.

No Drawing.  Application filed January 8, 1906. Serial No. 295,161.

*To all whom it may concern:*

Be it known that I, REINHARD OEHME, a subject of the King of Saxony, residing in Rue du Progrès 287, Brussels, in the Kingdom of Belgium, have invented certain new and useful Improvements in Processes of Concentrating Fruit-Juices.

My invention relates to and has for its object a process of manufacturing concentrated fruit-juices or fruit extracts in which the fresh fruit juice and aromatic substances or perfume are separated from one another and afterward united again after the juice has been concentrated, with the object of obtaining a concentrated fruit-juice or fruit-extract corresponding exactly to the original fresh fruit from which it is obtained.

My new process consists in extracting the aromatic substances or perfumes from juices obtained in the usual manner from fruits of all kinds by thoroughly mixing such juices with a suitable solvent of the aromatic substances such as chloroform, benzin, benzol, petroleum, ether, bisulfid of carbon, perchlorid of carbon ($CCl_4$), amyl acetate, etc. or with mixtures of these solvents, said solvents being equivalents for applicant's purpose, all of which have a boiling point below that of fruit juice. After this mixing the juice and solvent, now containing the aromatic substances are separated. Such juice and such solvent are then separately worked up by concentrating the juice, preferably by evaporation in vacuum, and by subjecting the solvent to a distilling action, preferably in a vacuum, so as to obtain the aroma, or aromatic substances as such. Finally by mixing the concentrated juice with the aroma thus extracted, a concentrated fruit-extract is obtained quite similar in taste and fragrance to fresh fruit juice.

Since most of the ripe fruits, especially the berries, spoil very easily and must therefore be quickly worked up, it is preferable to add a certain quantity of alcohol (ethyl or methyl alcohol) to such fruits, or to the juice obtained in the usual manner from such fruits, by which means the latter is preserved at once. Fermented juice should be mixed with from 3 to 6%, unfermented with from 10 to 15% of alcohol. If an apparatus for pasteurizing the juice be at hand, the alcohol can be dispensed with. In any case the result to be obtained, in the one way or the other, is that the manufacturer of fruit-juice or fruit-extract is enabled to distribute the factory labor over the space of a whole year and to utilize the plant and apparatus more efficiently, and without being obliged to overstrain the workmen in the reaping time.

I will now give an example illustrative of my new process: 500 kilograms of raspberries are slightly squeezed and mixed with 50 kilograms of alcohol of 90 to 92%. As soon as it is required, or as soon as the time may allow, the juice is pressed out. Or the squeezed or mashed raspberries may be fermented and pressed and the juice so obtained may be mixed either with 20–25 kg. of 90–92% alcohol or at least pasteurized in case the juice is not worked up immediately. If worked up immediately the alcohol or the pasteurization may be omitted. The clear juice obtained in any of these equivalent ways is thoroughly mixed with 35 kg. of chloroform and placed in a decanting vessel. The chloroform extract (about 1.52 specific gravity) is insoluble in the fruit juices and separates out while standing. The fruit juice is now decanted and the chloroform extract is distilled preferably in vacuum and all the chloroform removed. The residue from the distillation of the chloroform is then dissolved in strong alcohol which solution is then cooled in order to remove the dissolved fat stuffs, wax, etc. and filtered in the cold, and finally the alcohol is distilled off in vacuum. The residue now obtained—generally consisting of 15 to 20 grams of a balsamic mass—is pure raspberry-aroma. The juice freed from its aroma by the said treatment with chloroform and from most of which chloroform it has also been already separated mentioned above, is thickened or concentrated, preferably also in vacuum, thereby regaining such quantity of the employed chloroform which has entered the solution, and furthermore all the alcohol employed with the exception of such proportion which has been left behind in the pressed berries. This proportion of the alcohol can be got in the form of raspberry spirits, by subjecting these pressed berries to a distilling operation.

In the case of the juice being thickened or concentrated to one-twentieth of its volume or weight as above described, a yield of 15 to 16½ kilograms of juice or extract is obtained showing about 40 degrees of Baumé. This extract or juice is mixed with the pure raspberry-aroma already obtained as above described.

Having thus described my invention, what I claim and desire to secure by Letters Patent is:—

1. The method of concentrating fruit juices which comprises mixing the natural fruit juice with a suitable solvent of the aromatic substances, separating the juice and the solvent containing the aromatic substances, freeing both the juice and aromatic substances from the solvent, concentrating the juice and mixing the aromatic substances with the concentrated juice, substantially as described.

2. The method of concentrating fruit juices which comprises mixing fruit juice with a solvent of the aromatic substances, separating the juice and the solvent containing the aromatic substances, removing any remaining solvent from the juice, and concentrating it, freeing the aromatic substances from the solvent and from the fatty matters and wax, and finally mixing the aromatic substances with the concentrated juice, substantially as described.

3. The method of concentrating fruit juices which comprises treating fruit juice with a solvent of the aromatic substances which is non-miscible with the juice, separating the solvent containing the aromatic substances from the juice, freeing the juice from any unseparated solvent, and concentrating it, freeing the aromatic substances from the solvent and from fatty matters and wax, and mixing said aromatic substances with the concentrated juice, substantially as described.

4. The method of concentrating fruit juices which comprises mixing the juice with chloroform allowing the chloroform to settle and decanting the juice, removing any remaining chloroform from the juice, and concentrating it, separating the chloroform from the aromatic substances, treating the residue with alcohol to remove the fatty substances and wax, removing the alcohol and mixing the residue with the concentrated juice, substantially as described.

5. The method of concentrating fruit juices, which consists in mashing the fruit and mixing it with alcohol until ready for use, then expressing the juice and mixing it with a solvent of the aromatic substances contained therein but not miscible with the juice, separating the solvent and juice, evaporating the removed solvent to obtain the aromatic substances, treating this residue with alcohol and thereby removing the fatty substances and wax from the aromatic substances concentrating the fruit juice that has been separated from the aromatic substances and at the same time removing any residue of solvent and alcohol remaining therein, and mixing the aromatic substances with the concentrated juice.

In witness whereof, I have hereunto signed my name in the presence of two subscribing witnesses.

REINHARD OEHME.

Witnesses:
A. BUHOMMOT,
WILLY MEYER.